US012675414B2

(12) United States Patent
Han et al.

(10) Patent No.: US 12,675,414 B2
(45) Date of Patent: Jul. 7, 2026

(54) FLUSHING DATA FROM CACHES

(71) Applicant: Dell Products L.P., Round Rock, TX (US)

(72) Inventors: Geng Han, Beijing (CN); Vamsi K. Vankamamidi, Hopkinton, MA (US); Jibing Dong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/893,176

(22) Filed: Sep. 23, 2024

(65) Prior Publication Data

US 2026/0086949 A1     Mar. 26, 2026

(51) Int. Cl.
  *G06F 12/08* (2016.01)
  *G06F 12/0864* (2016.01)
  *G06F 12/0882* (2016.01)
  *G06F 12/0891* (2016.01)

(52) U.S. Cl.
  CPC ...... *G06F 12/0891* (2013.01); *G06F 12/0864* (2013.01); *G06F 12/0882* (2013.01)

(58) Field of Classification Search
  CPC ............. G06F 12/0891; G06F 12/0864; G06F 12/0882

USPC .......................................................... 711/118
See application file for complete search history.

(56) References Cited

U.S. PATENT DOCUMENTS

| | | | |
|---|---|---|---|
| 10,180,790 B1 * | 1/2019 | Taylor ................... | G06F 3/0608 |
| 11,340,829 B1 | 5/2022 | Shveidel et al. | |
| 2021/0342153 A1 * | 11/2021 | Han ...................... | G06F 9/5022 |
| 2022/0236898 A1 | 7/2022 | Li et al. | |
| 2022/0334965 A1 | 10/2022 | Shveidel et al. | |
| 2022/0342594 A1 | 10/2022 | Vankamamidi et al. | |
| 2022/0342825 A1 | 10/2022 | Derzhavetz et al. | |

* cited by examiner

*Primary Examiner* — Hua J Song

(74) *Attorney, Agent, or Firm* — BainwoodHuang

(57) ABSTRACT

A technique is directed to flushing data from a cache. The technique includes populating a first group of page-descriptor containers with page descriptors identifying data pages to flush from a cache. The technique further includes, after populating the first group of page-descriptor containers, populating a second group of page-descriptor containers with additional page descriptors in place of populating the first group of page-descriptor containers. The technique further includes directing a flushing service to access the first group of page-descriptor containers to obtain the page descriptors identifying the data pages when flushing the data pages from the cache.

19 Claims, 8 Drawing Sheets

700

702 — Populate a first group of page-descriptor containers with page descriptors identifying data pages to flush from a cache.

704 — After populating the first group of page-descriptor containers, populate a second group of page-descriptor containers with additional page descriptors in place of populating the first group of page-descriptor containers.

706 — Direct a flushing service to access the first group of page-descriptor containers to obtain the page descriptors identifying the data pages when flushing the data pages from the cache.

290

Electronic Circuitry 200

Set of Interfaces 202

220

Memory 204

Operating System 222

Specialized Instructions and Data 224
for Cache Management

Ingest Manager 226

Flush Manager 228

Other Code and Data 230
(e.g., Evaluation and Optimization Tools, Utilities,
User-Level Applications, etc.

Processing Circuitry 206

Other Componentry 208
(e.g., User I/O Equipment, Power Supplies, etc.)

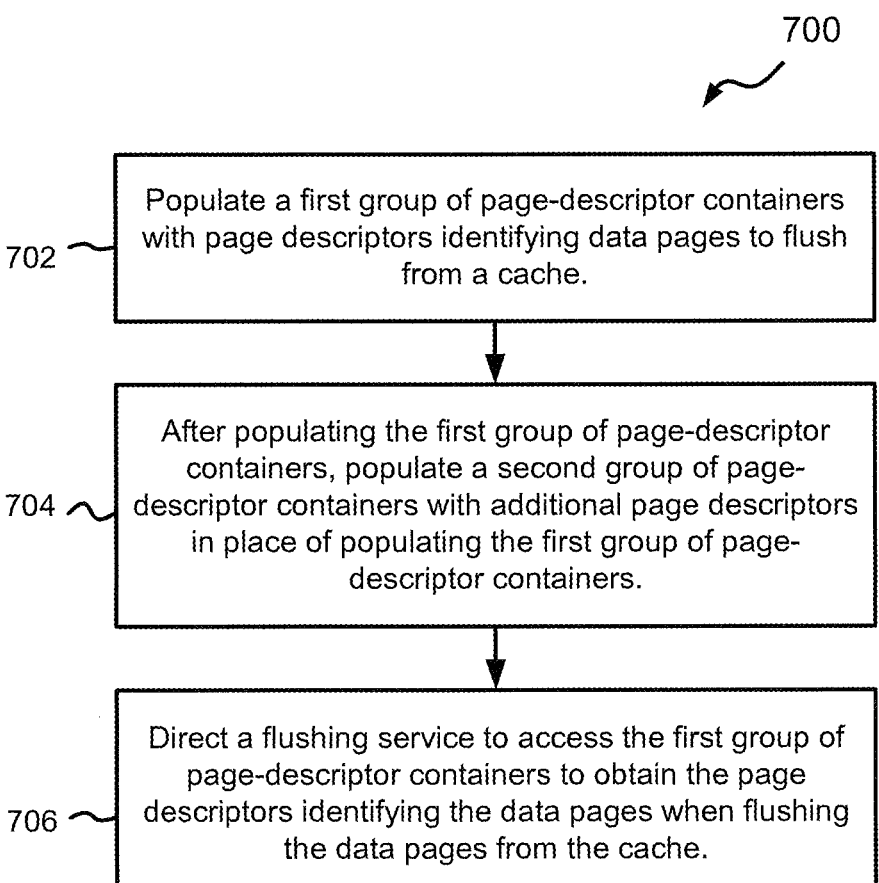

700

702 — Populate a first group of page-descriptor containers with page descriptors identifying data pages to flush from a cache.

704 — After populating the first group of page-descriptor containers, populate a second group of page-descriptor containers with additional page descriptors in place of populating the first group of page-descriptor containers.

706 — Direct a flushing service to access the first group of page-descriptor containers to obtain the page descriptors identifying the data pages when flushing the data pages from the cache.

FIG. 7

FLUSHING DATA FROM CACHES

BACKGROUND

A typical data storage system includes a ring buffer that contains page descriptors identifying pages to be flushed from primary storage to secondary storage. The ring buffer includes a tail pointer and a head pointer. The tail pointer identifies the oldest page descriptor in the ring buffer, and the head pointer identifies a position at which the system inserts new page descriptors into the ring buffer.

During operation, when the system flushes a page identified by the oldest page descriptor, the system adjusts the tail pointer to identify the next oldest page descriptor in the ring buffer, thereby enabling the system to reclaim storage space allocated to storing the oldest page descriptor. Further, when the system ingests new data pages into primary storage, the system inserts a page descriptor at the position that head pointer identifies and adjusts the head pointer to identify a new position at which the system inserts a new page descriptor. Such operation continues while there is storage space in the ring buffer.

SUMMARY

Unfortunately, ring buffers have limited storage capacities and may run out of storage space to insert page descriptors, e.g., during a busy period. While a ring buffer is at capacity, a system cannot ingest new data pages until the system flushes the page identified by the oldest page descriptor and adjusts the tail pointer to reclaim storage space in the ring buffer. Thus, if the system does not adequately prioritize flushing the page identified by the oldest page descriptor, the system may encounter periods in which the system cannot ingest new pages, causing large spikes in latency. What is needed, therefore, is a way of flushing pages that reliably provides storage space for new pages.

The above need is addressed at least in part by an improved technique for flushing data from a cache, in which page descriptors identifying data pages to flush from the cache populate groups of page-descriptor containers. Once a group of page-descriptor containers is sufficiently filled, new page descriptors begin populating a replacement group of page-descriptor containers. A flushing service accesses the filled group of page-descriptor containers to obtain the page descriptors identifying data pages to flush. Providing such groups of page-descriptor containers enables the flushing service to flush consistent amounts of data from the cache. As a result, the flushing service is able to free storage space in the cache at a steady rate, enabling the cache to store new data pages without large spikes in latency caused by insufficient space.

One embodiment is directed to a method for flushing data from a cache. The method includes populating a first group of page-descriptor containers with page descriptors identifying data pages to flush from a cache. The method further includes, after populating the first group of page-descriptor containers, populating a second group of page-descriptor containers with additional page descriptors in place of populating the first group of page-descriptor containers. The method further includes directing a flushing service to access the first group of page-descriptor containers to obtain the page descriptors identifying the data pages when flushing the data pages from the cache.

Another embodiment is directed to data storage equipment including memory and control circuitry coupled to the memory. The memory stores instructions which, when carried out by the control circuitry, cause the control circuitry to perform a method of:

(A) populating a first group of page-descriptor containers with page descriptors identifying data pages to flush from a cache;

(B) after populating the first group of page-descriptor containers, populating a second group of page-descriptor containers with additional page descriptors in place of populating the first group of page-descriptor containers; and (C) directing a flushing service to access the first group of page-descriptor containers to obtain the page descriptors identifying the data pages when flushing the data pages from the cache.

Yet another embodiment is directed to a computer program product having a non-transitory computer readable medium which stores a set of instructions to flush data from a cache. The set of instructions, when carried out by computerized circuitry, causes the computerized circuitry to perform a method of:

(A) populating a first group of page-descriptor containers with page descriptors identifying data pages to flush from a cache;

(B) after populating the first group of page-descriptor containers, populating a second group of page-descriptor containers with additional page descriptors in place of populating the first group of page-descriptor containers; and (C) directing a flushing service to access the first group of page-descriptor containers to obtain the page descriptors identifying the data pages when flushing the data pages from the cache.

In some embodiments, the page descriptors include location metadata identifying storage locations in secondary storage to which to flush the data pages. Further, populating the first group of page-descriptor containers includes adding sets of page descriptors to respective containers of the first group of page-descriptor containers based on the location metadata.

In some embodiments, adding the sets of page descriptors to the respective containers of the first group of page-descriptor containers includes adding multiple page descriptors to a container of the first group of page-descriptor containers. The flushing service obtains the multiple page descriptors from the container to identify multiple data pages to flush together from the cache.

In some embodiments, the containers of the first group of page-descriptor containers are constructed and arranged to cover respective ranges of storage locations in the secondary storage. Further, adding the sets of page descriptors to the respective containers of the first group of page-descriptor containers includes adding a set of page descriptors to a particular container of the first group of page-descriptor containers based on the set of page descriptors including location metadata identifying a respective set of storage locations within a range of storage locations covered by the particular container.

In some embodiments, the method further includes hashing the location metadata to generate hash values identifying buckets in a set of hash tables. The buckets include the containers of the first group of page-descriptor containers to which the sets of page descriptors are added.

In some embodiments, a first hash table has a first plurality of buckets, a first bucket of the first plurality of buckets including a second hash table having a second plurality of buckets, a second bucket in the second plurality of buckets including one or more of the containers of the first group of page-descriptor containers. Further, hashing the location metadata includes:

(A) hashing a first metadata value included in a particular page descriptor to generate a first hash value identifying the first bucket of the first plurality of buckets; and (B) hashing a second metadata value included in the particular page descriptor to generate a second hash value identifying the second bucket of the second plurality of buckets from the second hash table included in the first bucket, the second bucket including a container of the first group of page-descriptor containers in which to add the particular page descriptor.

In some embodiments, hashing the first metadata value includes hashing, as the first metadata value, an extent identifier indicating a storage extent in secondary storage to which to flush a data page identified by the particular page descriptor. Further, hashing the second metadata value includes hashing, as the second metadata value, a logical-address identifier indicating a logical address within the storage extent to which to flush the data page.

In some embodiments, the page descriptors populating the first group of page-descriptor containers include a first page descriptor and a second page descriptor identifying respective data pages. Further, hashing the location metadata includes generating a common hash value from hashing respective location metadata of the first page descriptor and the second page descriptor. The respective location metadata indicates different respective storage locations to which to flush the respective data pages. The common hash value identifies a particular bucket in the set of hash tables. Even further, adding the sets of page descriptors to the respective containers includes adding both the first page descriptor and the second page descriptor to a container in the particular bucket.

In some embodiments, the method further includes receiving a set of input/output (I/O) requests from a set of hosts. The set of I/O requests provide a change in an I/O workload of the cache. The method further includes adjusting, based on the change in the I/O workload, at least one of: (i) a number of the buckets storing the containers of the first group of page-descriptor containers to which the sets of page descriptors are added or (ii) a storage size allocated to one or more of the containers of the first group of page-descriptor containers.

In some embodiments, the method further includes incrementing a resource count based on the flushing service flushing a set of data pages from the cache. The resource count indicates resources allocated to cache storage. The method further includes, when populating the second group of page-descriptor containers with the additional page descriptors, consuming the resources allocated to cache storage. A rate at which the cache ingests data pages identified by the additional page descriptors is limited while the resource count indicates insufficient resources allocated to cache storage.

In some embodiments, the resource count is a number of tokens in a token pool. The tokens indicate resources allocated to storing the additional page descriptors in the second group of page-descriptor containers. Further, incrementing the count of the resource counter includes increasing the number of tokens in the token pool based on a number of data pages in the set of data pages that the flushing service flushes from the cache.

In some embodiments, the method further includes, after populating the second group of page-descriptor containers, populating a third group of page-descriptor containers with other page descriptors in place of populating the second group of page-descriptor containers. The method further includes, while the third group of page-descriptor containers is being populated, directing the flushing service to flush (i) at least a portion of the data pages identified by the page descriptors populating the first group of page-descriptor containers and (ii) at least a portion of additional data pages identified by the additional page descriptors populating the second group of page-descriptor containers.

In some embodiments, the method further includes, after directing the flushing service to access the first group of page-descriptor containers to flush the data pages, detecting that the cache has exceeded a predefined fullness level. The method further includes, in response to detecting that the cache has exceeded a predefined fullness level, directing the flushing service to increase a rate at which the flushing service flushes the data pages from the cache.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 7 is a flowchart of a procedure which is performed by specialized equipment in accordance with certain embodiments.

DETAILED DESCRIPTION

Embodiments of the improved technique will now be described. One should appreciate that such embodiments are provided by way of example to illustrate certain features and principles but are not intended to be limiting.

An improved technique is directed to flushing data from a cache. Along these lines, page descriptors identifying data pages to flush from the cache populate groups of page-descriptor containers. Once a group of page-descriptor containers is sufficiently populated, new page descriptors begin populating a replacement group of page-descriptor containers. A flushing service accesses the filled group of page-descriptor containers to obtain the page descriptors identifying the data pages to flush. Providing such groups of page-descriptor containers enables the flushing service to flush consistent amounts of data from the cache. As a result, the flushing service can reclaim storage space in the cache at a steady rate, enabling the cache to store new data pages without large spikes in latency from insufficient storage space.

Figure 1:
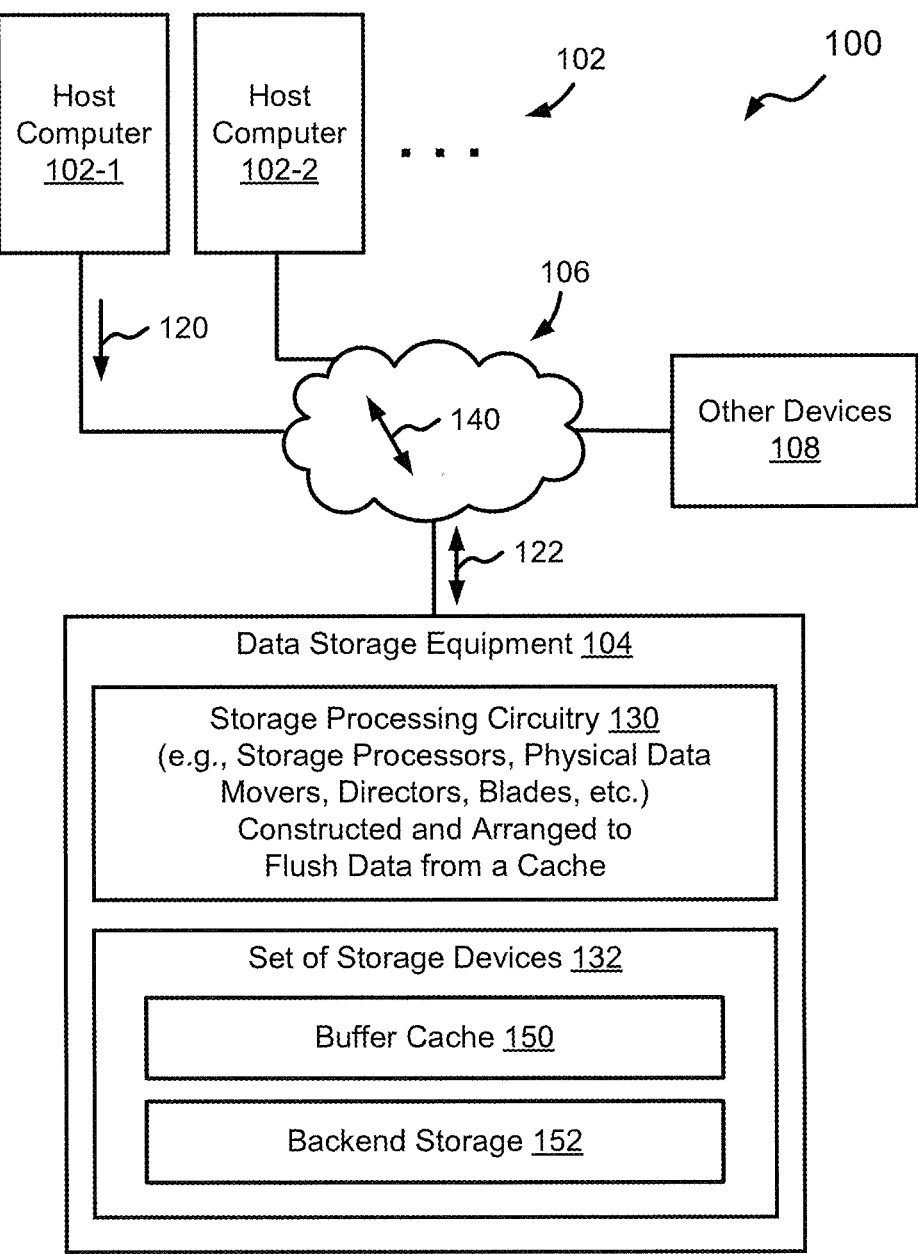
FIG. 1 is a block diagram of an example environment in which embodiments of the improved technique can be practiced.

FIG. 1 shows an example electronic environment 100 that flushes data from a cache in accordance with certain embodiments. The electronic environment 100 includes host computers 102-1, 102-2, . . . (collectively, host computers 102), data storage equipment 104, a communications medium 106, and optionally other devices 108.

Each of the host computers 102 is constructed and arranged to perform useful work. In some embodiments, one or more of the host computers 102 operate as a file server, a web server, an email server, an enterprise server, a database server, a transaction server, combinations thereof, etc. which provide host input/output (I/O) requests 120 to the data storage equipment 104. In some embodiments, the host computers 102 provide a variety of different host I/O requests 120 (e.g., block and/or file-based write commands, block and/or file-based read commands, combinations thereof, etc.) that direct the data storage equipment 104 to richly and reliably store host data 122 within and retrieve the host data 122 from storage (e.g., primary storage or main memory, secondary storage, tiered storage, combinations thereof, etc.).

The host data 122 is organized into data pages, e.g., contiguous units of data. In some embodiments, the data pages have a uniform size, e.g., 4 kilobytes (kB), 8 KB, etc. Page descriptors identify the data pages. In some embodiments, the page descriptors include location metadata identifying storage locations in secondary storage to which to flush (write) the data pages.

The data storage equipment 104 (e.g., a storage array, a storage system, etc.) includes storage processing circuitry 130, and storage devices 132. The storage processing circuitry 130 is constructed and arranged to respond to the host I/O requests 120 from the host computers 102 by writing data into the storage devices 134 and reading the data from the storage devices 134.

The storage processing circuitry 130 may include one or more storage processors or engines, data movers, director boards, blades, I/O modules, storage device controllers, switches, other hardware, combinations thereof, and so on.

The set of storage devices 132 includes one or more types of storage drives, e.g., non-volatile random-access memory (NVRAM) devices, solid state drives (SSDs), hard disk drives (HDDs), combinations thereof, and so on. The set of storage devices 132 is configured as a buffer cache 150 and a secondary storage 152. The buffer cache 150 is constructed and arranged to temporarily store data pages en route to the secondary storage 152. The buffer cache 150 is further constructed and arranged to store, in one or more page-descriptor containers, page descriptors identifying the data pages. The secondary storage 152 provides persistent/non-volatile storage in accordance with one or more RAID data protection schemes.

In some embodiments, at least a portion of the secondary storage 152 provides non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

The communications medium 106 is constructed and arranged to connect the various components of the storage system setting 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub and spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the storage system setting 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation, the storage processing circuitry 130 receives the host I/O request 120, which include data pages to write to the secondary storage 152 and which further include page descriptors identifying the data pages. In response, the storage processing circuitry 130 temporarily stores the data pages in the buffer cache 150 and populates a first group of page-descriptor containers in the buffer cache 150 with page descriptors identifying the data pages. When the first group of page-descriptor containers becomes sufficiently populated, the storage processing circuitry 130 beings populating a second group of page-descriptor containers in place of populating the first group of page-descriptor containers.

Further during operation, the storage processing circuitry 130 directs a flushing service to flush the data pages from the buffer cache 150. In response, the flushing service accesses the first group of page-descriptor containers to obtain the page descriptors. From the page descriptor, the flushing service identifies data pages to flush and further identifies storage locations in the secondary storage 152 to which to flush the data pages.

It should be appreciated that obtaining page descriptors from a group of page-descriptor containers enables the storage processing circuitry 130 to provide a consistent flushing behavior when flushing data pages from the buffer cache 150. That is, by flushing data pages identified by the page descriptors populating a group of page-descriptor containers, the storage processing circuitry 130 flushes a consistent amount of data from the buffer cache 150, which frees a consistent amount of storage space in the buffer cache 150. As a result, the storage processing circuitry 130 is able to reclaim resources (e.g., storage space) in the buffer cache 150 at a steady rate. Advantageously, such operation enables the storage processing circuitry 130 to avoid long periods in which the buffer cache 150 lacks resources to ingest new data pages. Further details will now be provided with reference to FIG. 2.

Figure 2:
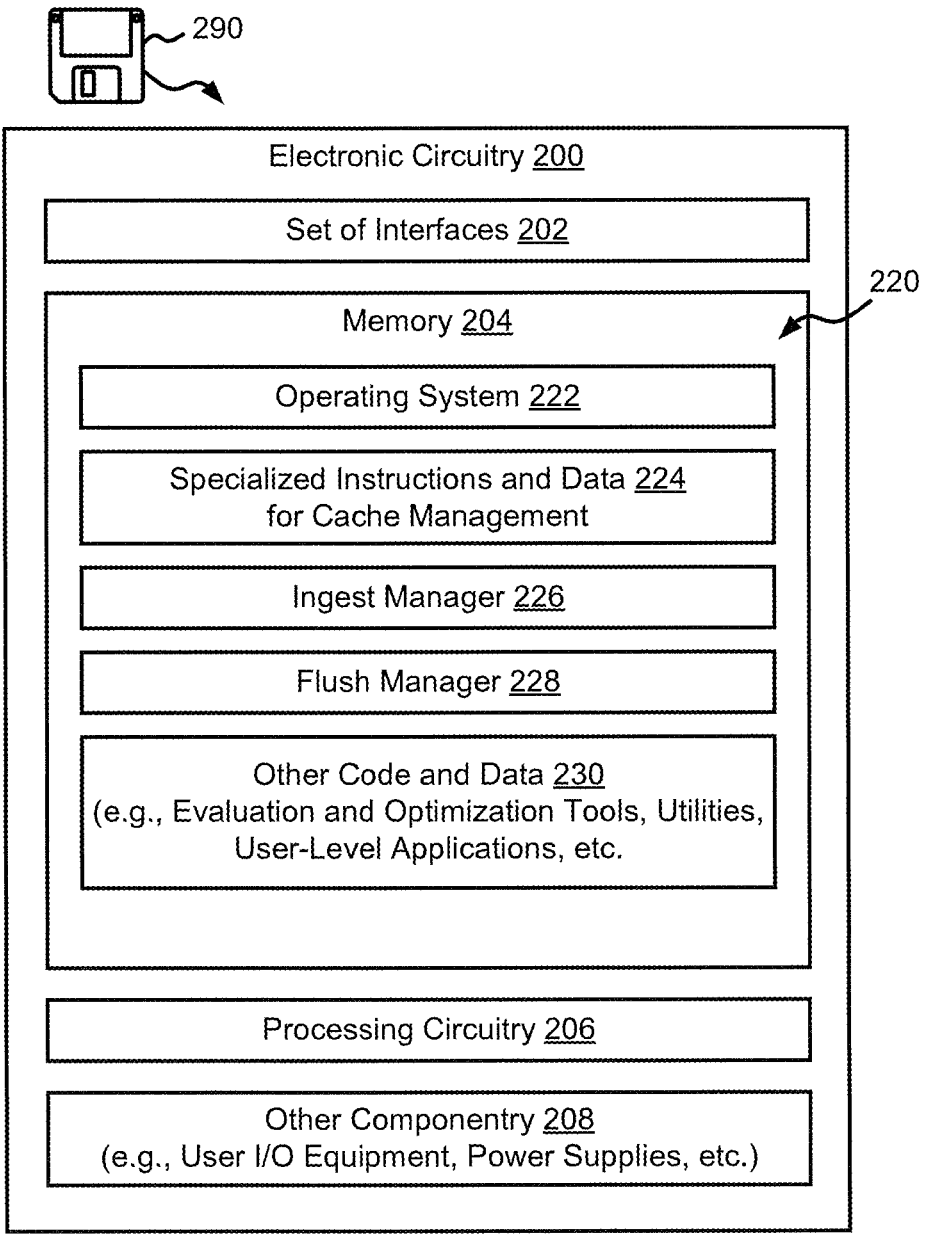
FIG. 2 is a block diagram of electronic equipment in accordance with certain embodiments.

FIG. 2 shows electronic circuitry 200 which is suitable for use for at least a portion of the data storage equipment 104 (FIG. 1) in accordance with certain embodiments. The electronic circuitry 200 includes a set of interfaces 202, memory 204, processing circuitry 206, and other circuitry (or componentry) 208.

The set of interfaces 202 is constructed and arranged to connect the electronic circuitry 200 to the communications medium 106 (FIG. 1) to enable communications with other devices of the electronic environment 100 (e.g., the host computers 102). Such communications may be IP-based, SAN-based, cellular-based, cable-based, fiber-optic-based, wireless, cloud-based, combinations thereof, and so on. Additionally, the set of interfaces 202 is constructed and arranged to connect the electronic circuitry 200 other local equipment such as the set of storage devices 132. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., flash memory, magnetic memory, etc.). The memory 204 stores a variety of software constructs 220 including an operating system 222, specialized instructions and data 224, an ingest manager 226, a flush manager 228, and other code and data 230.

The operating system 222 refers to particular control code such as a kernel to manage computerized resources (e.g., processor cycles, memory space, etc.), the IO stack (e.g., drivers), and so on.

The specialized instructions and data 224 refer to particular instructions for flushing data from a cache. In some arrangements, the specialized instructions and data 124 are tightly integrated with or part of the operating system 222 itself.

The ingest manager 226 is configured to store the host data 122 (FIG. 1) from received from the hosts 102 in the buffer cache 150. The ingest manager 226 is further configured to add page descriptors identifying data pages of the host data 122 to containers of groups of page-descriptor containers maintained in the buffer cache 150.

The flush manager 228 is configured to provide a flushing service that flushes the host data 122 from the buffer cache 150 to the secondary storage 152. Along these lines, the flush manager 228 is configured to access containers of a group of page-descriptor containers to obtain respective sets of page descriptors identifying data pages to flush from the buffer cache 150. Further, in some embodiments, the flush manager 228 is configured to flush multiple data pages together, e.g., in a single flush job. Further still, in some embodiments, the flush manager 228 is configured to perform multiple flush jobs in parallel. In some embodiments, the flush manager 228 is configured to increase or decrease a rate at which the flush manager 228 flushes the data pages, e.g., by adjusting a number of flush jobs that the flush manager 228 performs at a given time.

The other code and data 230 refer to applications and routines to provide additional operations and services (e.g., performance measurement tools, etc.), user-level applications, administrative tools, utilities, and so on.

The processing circuitry 206 is constructed and arranged to operate in accordance with the various software constructs 220 stored in the memory 204. As will be explained in further detail shortly, the processing circuitry 206 executes the operating system 222 and the specialized instructions and data 224 to form specialized circuitry that robustly and reliably manages host data on behalf of a set of hosts. Such processing circuitry 206 may be implemented in a variety of ways including via one or more processors (or cores) running specialized software, application-specific integrated circuits (ASICs), field-programmable gate arrays (FPGAs) and associated programs, discrete components, analog circuits, other hardware circuitry, combinations thereof, and so on. In the context of one or more processors executing software, a computer program product 290 is capable of delivering all or portions of the software constructs 220 to the electronic circuitry 200. In particular, the computer program product 290 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include special user IO equipment (e.g., a service processor), buses, cabling, adaptors, auxiliary apparatuses, other specialized data storage componentry, etc. Further details will now be provided with reference to FIGS. 3a through 3d.

FIGS. 3a through 3d show example operation of the data storage equipment 104 (FIG. 1) to add data to and to flush data from the buffer cache 150 in accordance with certain embodiments.

The buffer cache 150 includes page-descriptor storage 310 and data-page storage 312. The page-descriptor storage 310 is divided into multiple groups of page-descriptor containers 320a, 320b, and 320c (collectively, groups of page-descriptor containers 320). In some embodiments, the groups of page-descriptor containers 320 have the same storage capacity.

In some embodiments, the page-descriptor storage 310 is a ring buffer that includes a head pointer indicating the newest page descriptor in the page-descriptor storage 310 and further includes a tail pointer indicating oldest page descriptor in the page-descriptor storage 310.

Containers in the groups of page-descriptor containers 320 are constructed and arranged to store page descriptors 330 that identify respective data pages 332 in the data-page storage 312. In some embodiments, the containers are constructed and arranged to cover respective ranges of storage locations in the secondary storage 152. That is, a particular container is constructed and arranged to store page descriptors that include location metadata identifying storage locations within a range of storage locations assigned to (covered by) the particular container.

The data-page storage 312 is constructed and arranged to store the data pages 332. In some embodiments, the data-page storage 312 is organized as a storage pool in which the data pages may be stored anywhere in available storage within the storage pool. In some embodiments, the page descriptors include respective pointers that point to the data pages stored in the data-page storage 312.

Figure 3A:
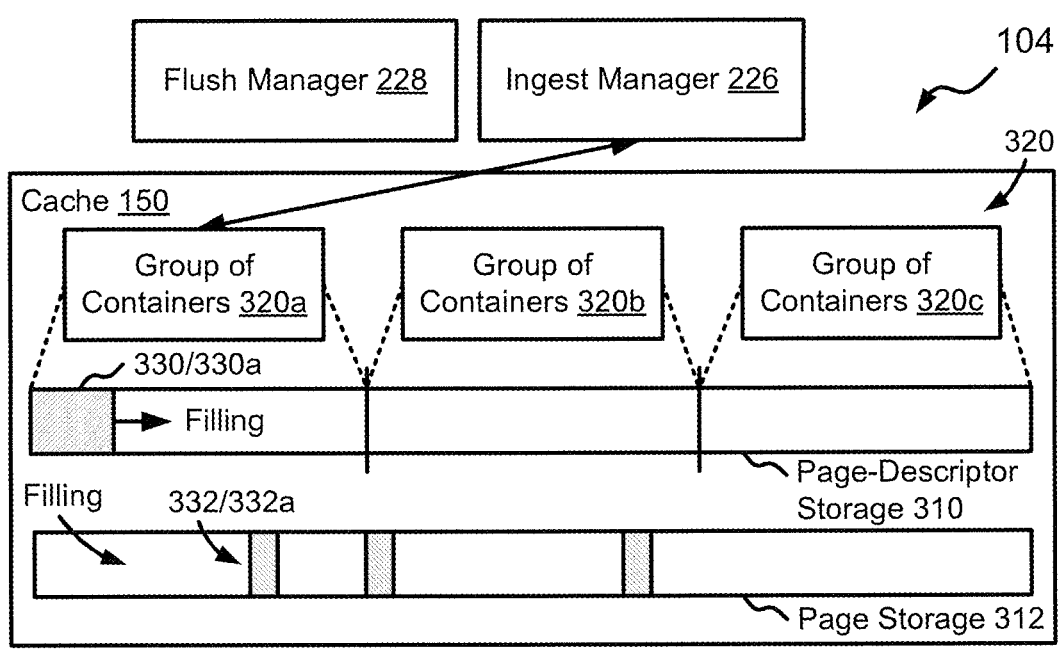
FIGS. 3a through 3d show example operation of the electronic equipment in accordance with certain embodiments.

During operation, the groups of page-descriptor containers 320 are initially empty. As shown in FIG. 3a, when the ingest manager 226 receives the host data 122 from the host computers 102 (FIG. 1), the ingest manager 226 begins to populate (fill) the page-descriptor storage 310 with the page descriptors 330, starting from a first group of page-descriptor containers 320a. Further, the ingest manager 226 begins to store the data pages 332 identified by the page descriptors 330 in the data-page storage 312.

In some embodiments, the ingest manager 226 selectively distributes the page descriptors 330a to particular containers of the first group of page-descriptor containers 320a. For example, the ingest manager 226 may add a page descriptor to a particular container based on a location in the secondary storage 152 to which to flush a data page identified by the page descriptor.

Figure 3B:
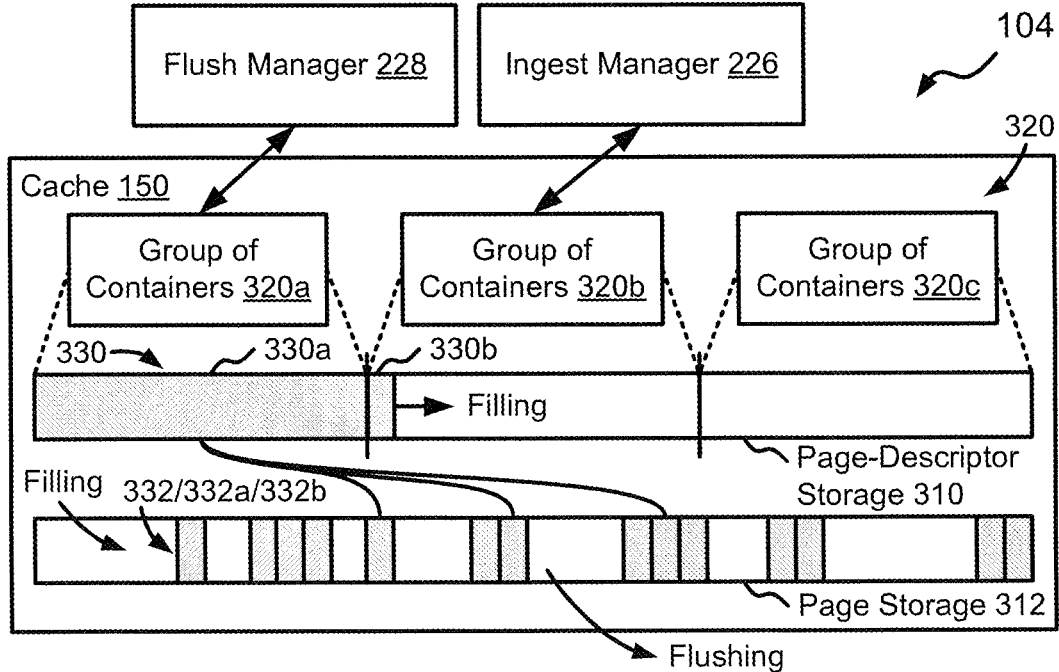

As shown in FIG. 3b, after the ingest manager 226 has populated the first group of page-descriptor containers 320a, the ingest manager 226 begins to populate the second group of page-descriptor containers 320b in place of the first group of page-descriptor containers 320a. Further, the flush manager 228 begins to flush the data pages 332a from the buffer cache 150. Along these lines, the flush manager 228 accesses the first group of page-descriptor containers 320a to obtain the page descriptors 330a. From the page descriptors 330a, the flush manager 228 identifies the data pages 332a in the data-page storage 312 to flush and further identifies locations in the secondary storage 152 to which to flush the data pages 332a.

In some embodiments, the containers of the first group of page-descriptor containers 320a provide respective sets of page descriptors identifying respective sets of data pages to flush. In these embodiments, the flush manager 228 flushes the sets of data pages in respective flush jobs. For example, the flush manager 228 may perform a first flush job to flush a first set of data pages identified by page descriptors from a first container, and may perform a second flush job to flush a second set of data pages identified by page descriptors from a second container. Further, in some embodiments, the flush manager 228 performs these flush jobs in parallel.

Figure 3C:
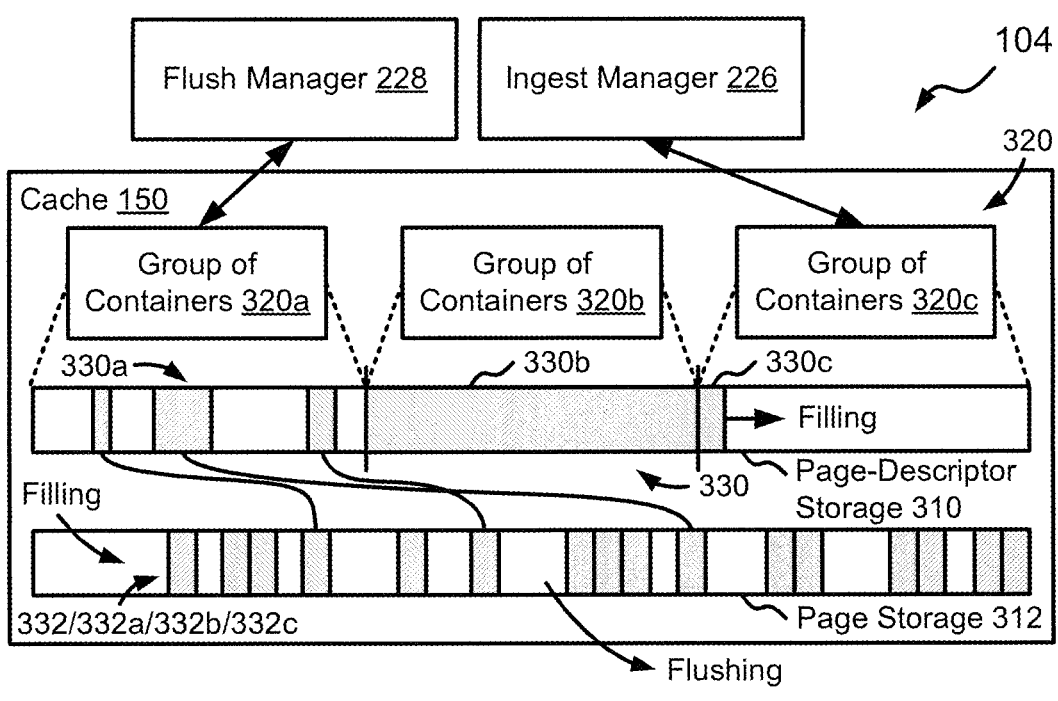

As shown in FIG. 3c, after the ingest manager 226 has populated the second group of page-descriptor containers 320b, the ingest manager 226 begins to populate the third group of page-descriptor containers 320c with other page descriptors 330c in place of populating the second group of page-descriptor containers 320b. Further, while the ingest manager 226 is populating the third group of page-descriptor containers 320c, the flush manager 228 continues to flush the data pages 332a identified by the page descriptors 330a populating the first group of page-descriptor containers 320a.

Figure 3D:
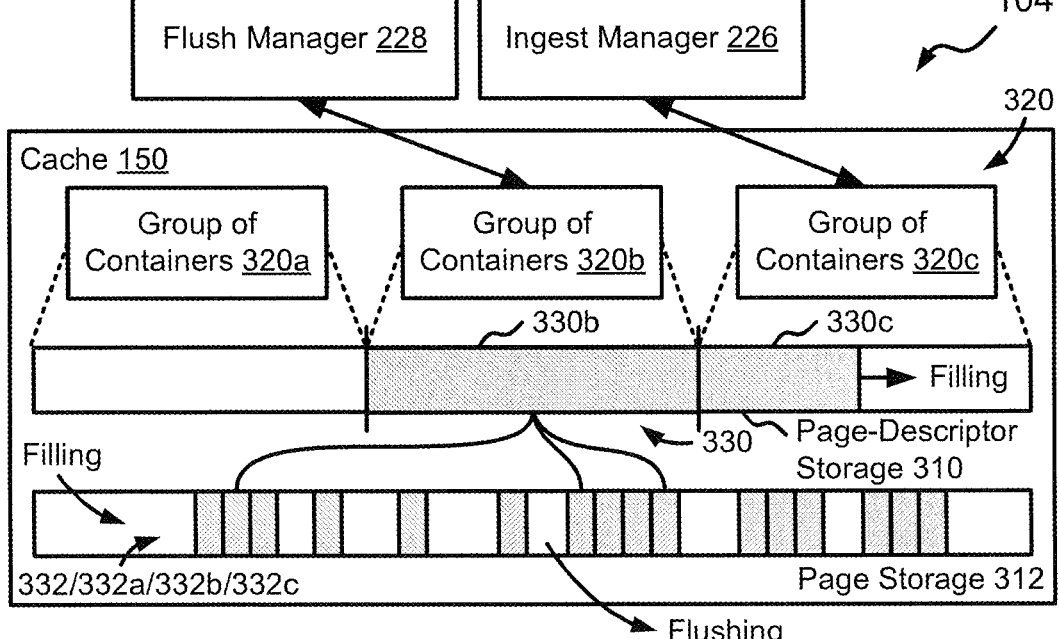

As shown in FIG. 3d, the flush manager 228 finishes flushing data pages 332a identified by page descriptors 330a populating the first group of page-descriptor containers 320a. At this point, the tail pointer of the page-descriptor storage 310, indicating the oldest page descriptor in the page-descriptor storage 310, is located at the beginning of the second group of page-descriptor containers 320b.

As further shown in FIG. 3d, after the flush manager 228 finishes flushing the data pages 332a, the flush manager 228 begins to flush the data pages 332b identified by the page descriptors 330b populating the second group of page-descriptor containers 320b. The flush manager 228 flushes the data pages 332b while the third group of page-descriptor containers 320c is being populated. In this manner, while the ingest manager 226 populates the third group of page-descriptor containers 320c, the flush manager 228 provides a flushing service that flushes (i) at least a portion of the data pages 332a identified by the page descriptors 330a populating the first group of page-descriptor containers 320a (as shown in FIG. 3c) and (ii) at least a portion of the data pages 332b identified by the page descriptors 330b populating the second group of page-descriptor containers 320b (as shown in FIG. 3d).

Advantageously, the above-described operation enables the tail pointer of the page-descriptor storage 310 to regularly progress. That is, once the flush manager 228 finishes flushing the first group of page-descriptor containers 320a, the tail pointer of the page-descriptor storage 310 is located at the beginning of the next (second) group of page-descriptor containers 320b. Accordingly, the flush manager 228 may reclaim storage space in the page-descriptor storage 310 that was previous used to store the page descriptors 330a, enabling such storage space to be reused to store new page descriptors. Advantageously, regularly reclaiming storage space in the buffer cache 150 consistently provides storage space to store new data, thereby reducing long periods in time in which the buffer cache 150 lacks capacity to ingest new data, improving operation of the buffer cache 150. Further details will now be provided with reference to FIG. 4.

Figure 4:
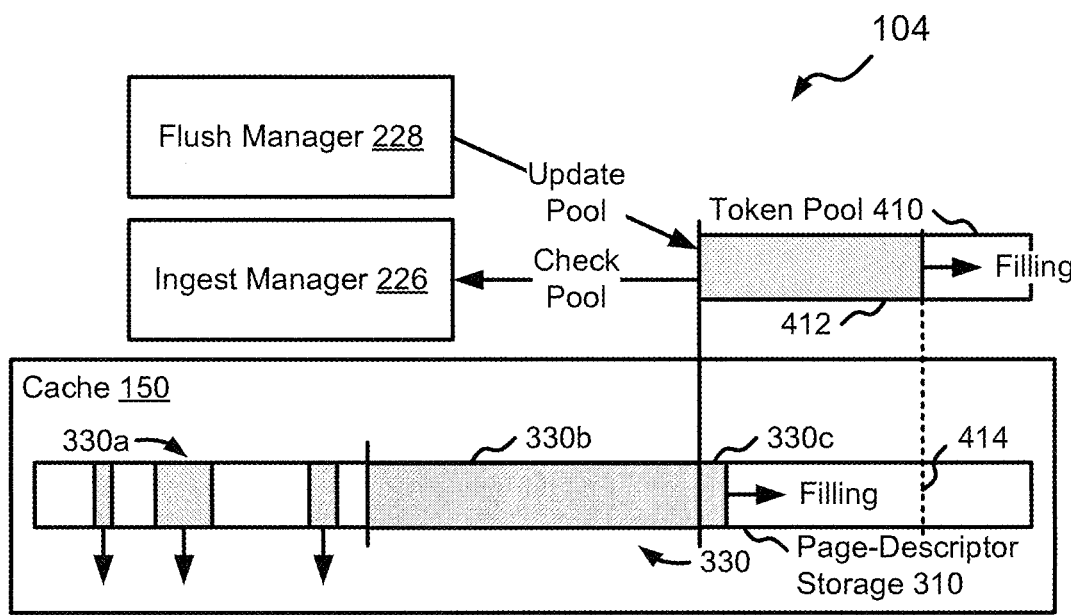
FIG. 4 shows additional example operation of the electronic equipment in accordance with certain embodiments.

FIG. 4 shows further example operation of the data storage equipment 104 while flushing the data pages 332a identified by the page descriptors 330a in the first group of page-descriptor containers 320a.

As shown, a token pool 410 is configured to store tokens 412 which provide a resource count indicating available resources allocated to cache storage in the buffer cache 150. As shown, the number of the tokens 412 indicates a current storage limit allocated to storing page descriptors in the third group of page-descriptor containers 320c (e.g., see the dashed line 414).

When flushing data pages from the buffer cache 150, the flush manager 228 is configured to increase the resource count by adding tokens to the token pool 410. In some embodiments, the flush manager 228 is configured to add a number of tokens to the token pool 410 based on a number of data pages flushed from the first group of page-descriptor containers 320a.

The ingest manager 226 is configured to access the token pool 410 to identify whether the third group of page-descriptor containers 320c is able to store more page descriptors. The ingest manager 228 is further configured to throttle (or otherwise limit) a rate at which the ingest manager 228 ingests new data pages to the buffer cache 150 while the number of page descriptors 330c populating the third group of page-descriptor containers 320c meets the current storage limit indicated by the number of tokens in the token pool 410.

During operation, the flush manager 228 flushes a set of data pages of the data pages 332a identified by the page descriptors 330a in the first group of page-descriptor containers 320a. While doing so, the flush manager 228 increments the resource count by increasing a number of tokens in the token pool 410. In some embodiments, the number of tokens that the flush manager 228 adds to the token pool 412 is based on the number of data pages that the flush manager 228 flushes from the buffer cache 150. For example, in some embodiments, the number of tokens added has a one-to-one relationship with the number of data pages flushed.

Further during operation, the ingest manager 226 attempts to populate the third group of page-descriptor containers 320c with the page descriptors 330c. Along these lines, prior to adding a page descriptor to the third group of page-descriptor containers 320c, the ingest manager 226 checks the number of tokens in the token pool 410 to identify the current storage limit of the third group of page-descriptor containers 320c. The ingest manager 226 then compares the number of the page descriptors 330c in the third group of page-descriptor containers 320c to the current storage limit. If the number of page descriptors 330c meets the current storage limit, then the ingest manager 226 limits data ingestion until the flush manager 228 increases the number of tokens.

It should be appreciated that the current storage limit may be less than an overall storage capacity of the third group of page-descriptor containers 320c. While the flush manager 228 flushes data pages from the buffer cache 150, the flush manager 228 adds tokens to the token pool 410 to increase the current storage limit, enabling the ingest manager 226 to further populate the third group of page-descriptor containers 320c. In this manner, the flush manager 228 regulates how quickly the ingest manager 226 fills the buffer cache 150.

In some embodiments, the current storage limit is based on a number of data pages that the flush manager 228 has flushed from the buffer cache 150. For example, in embodiments, the number of tokens that the flush manager 228 adds to the token pool 410 matches a number of the data pages 332a that the flush manager 228 flushes from the buffer cache 150. In these embodiments, the ingest manager 226 is able to fully populate the third group of page-descriptor containers 320c once the flush manager 228 has finished flushing the data pages 332a identified by the page descriptors 330a populating the first group of page-descriptor containers 320a. As a result, the flush manager 228 may reclaim resources occupied by the first group of page-descriptor containers 320a before the ingest manager 226 fully populates the third group of page-descriptor containers 320c. In this manner, the flush manager 228 may consistently provide resources for ingesting new data pages, avoiding large spikes in latency caused by insufficient resources to ingest new data. Further details will now be provided with reference to FIG. 5.

Figure 5:
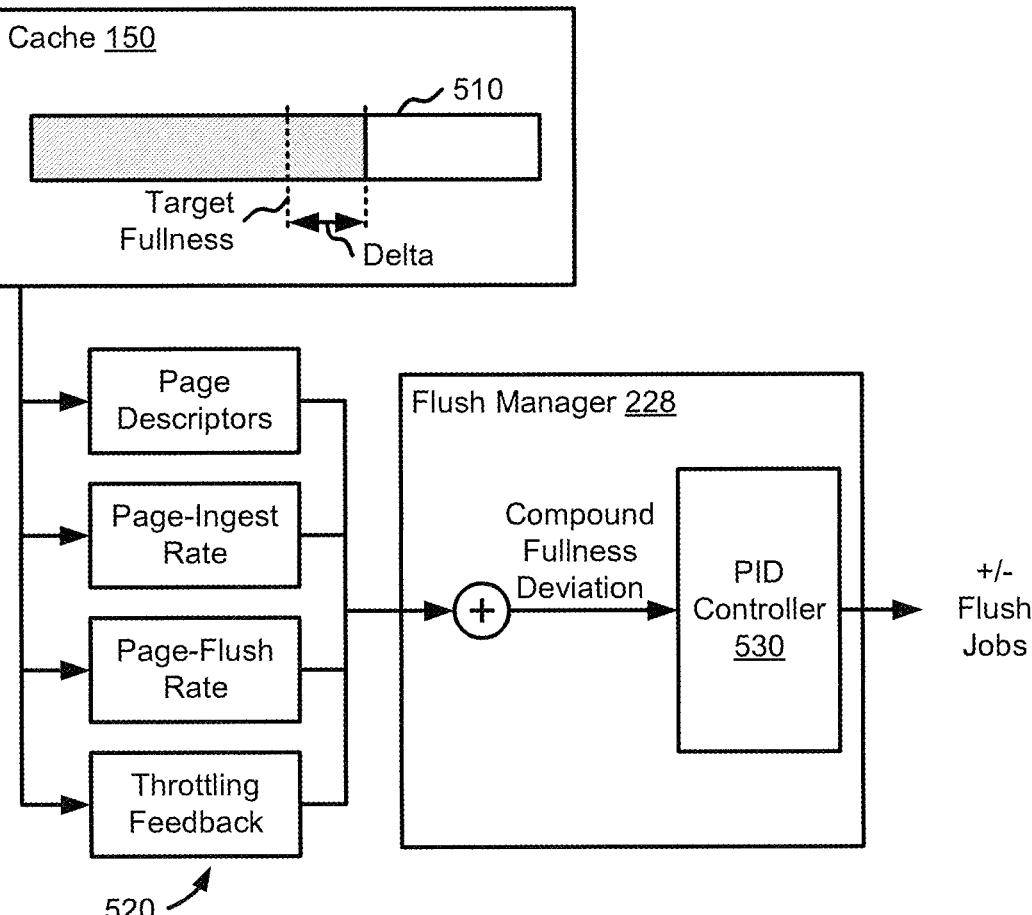
FIG. 5 shows additional features of the electronic equipment in accordance with certain embodiments.

FIG. 5 shows additional features of the buffer cache 150 and the flush manager 228. The flush manager 228 is configured to monitor various metrics 520 of the buffer cache 150 and dynamically adjust a number of flush jobs based on the metrics 520. The flush manager 228 includes a proportional-integral-derivative (PID) controller 320 which controls the number of flush jobs.

Example metrics 520 include a status of the page-descriptor storage, a page-ingest rate, a page-flush rate, and throttling feedback. The status of the page-descriptor storage includes, for example, a position of the head pointer and the tail pointer of the page-descriptor storage 310, which indicate the availability of resources to store additional page descriptors. The page-ingest rate refers to a rate in which the ingest manager 226 adds new data pages to the buffer cache 150. The page-flush rate refers to a rate in which the flush manager 226 flushes data pages from the buffer cache 150. Throttling feedback refers to information that the ingest manager 226 provides when throttling the ingestion of new data pages, e.g., when a number of page descriptors populating a particular group of page-descriptor containers meets a current storage limit (see FIG. 4).

During operation, the flush manager 228 sets a regulation target, e.g., target amount of resource utilization or fullness level. The flush manager 228 further acquires the metrics 520 to derive a compound deviation value indicating a deviation from the regulation target (a "delta"). The flushing manager 228 then feeds the compound deviation value to the PID controller 530, which may adjust a number of flush jobs to change a rate at which the flush manager 228 flushes data pages from the buffer cache 150. For example, in response to detecting that the buffer cache 150 has exceeded a predefined fullness level, the PID controller 530 may increase a number of flush jobs to increase a rate at which the flush manager 228 flushes data pages from the buffer cache 150.

Further during operation, the flush manager 228 may detect throttling of data ingestion even when the buffer cache 150 has not exceeded a predefined fullness level, e.g., due to proactive throttling provided by embodiments described above in regards to FIG. 4. In response, the flush manager 228 may increase a number of flush jobs to enable faster reclamation of resources. Further details will now be provided with reference to FIG. 6.

Figure 6:
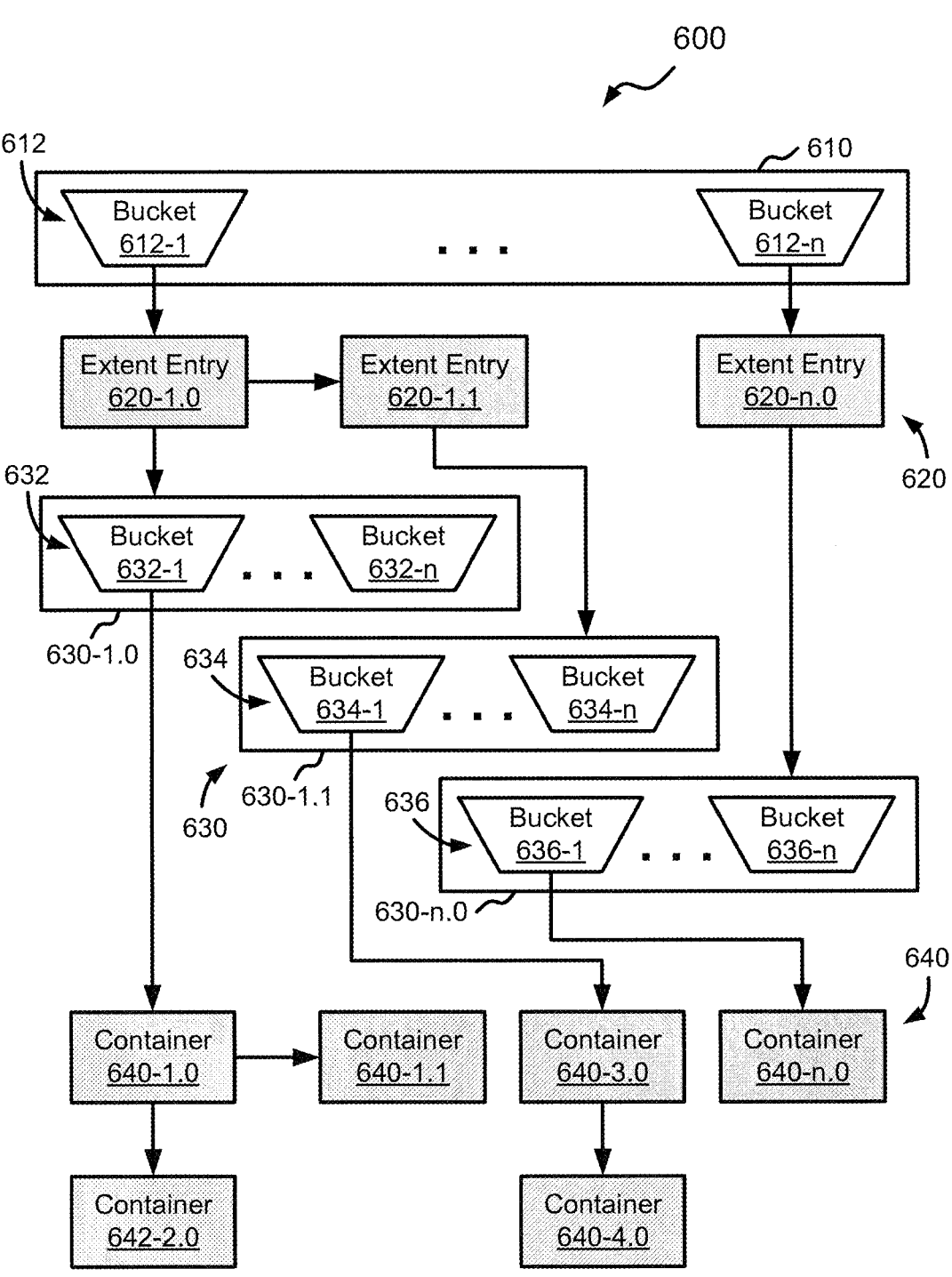
FIG. 6 shows an example data structure that provides page-descriptor containers in accordance with certain embodiments.

FIG. 6 shows an example data structure 600 that contains a group of page-descriptor containers in accordance with certain embodiments. The data structure 600 is configured to store page descriptors in containers based on storage locations in the secondary storage 152 where data pages are to be flushed. In some embodiments, the buffer cache 150 maintains a respective data structure 600 for each of the groups of containers 320 (FIGS. 3a through 3d).

The data structure 600 includes a first hash table 610 having buckets 612-1, . . . , 612-n (collectively, a first plurality of buckets 612). The buckets of the first plurality of buckets 612 are paired with respective hash values of the first hash table 610.

Within the buckets of the first plurality of buckets 612 are respective sets of extent entries 620-1.0, 620-1.1, . . . , 620-n.0 (collectively, extent entries 620). The extent entries 620 identify respective storage extents in the secondary storage 152, e.g., a RAID extent or other grouping of storage in the secondary storage 152. As shown, the bucket 612-1 contains extent entries 620-1.0 and 620-1.1, bucket 612-n contains extent entry 620-n.0, and so forth. In some embodiments, the extent entries in a particular bucket are organized as a linked list.

At the extent entries 620 are respective second hash tables 630-1.0, 630-1.1, . . . , 630-n.0 (collectively, second hash tables 630). As shown, hash table 630-1.0 is located at extent entry 620-1.0, hash table 630-1.1 is located at extent entry 620-1.1; hash table 630-n.0 is located at extent entry 620-n.0.

The second hash tables 630 have respective second pluralities of buckets 632, 634, . . . , 636. As shown, the hash table 630-1.0 has buckets 632-1, . . . , 632-n (collectively, the plurality of buckets 632); the hash table 630-1.1 has buckets 634-1, . . . , 634-n (collectively, the plurality of buckets 634); the hash table 630-n has buckets 636-1, . . . , 636-n (collectively, the plurality of buckets 636). The buckets of the second pluralities of buckets 632, 634, and 636 are paired with respective hash values of the second hash tables 630.

At the buckets of the second pluralities of buckets 632, 634, and 636 are page-descriptor containers 640. In some embodiments, the containers 640 constitute a group of page-descriptor containers, e.g., the first group of page-descriptor containers 320a. In some embodiments, the containers 640 in a particular bucket are organized as a linked list.

When ingesting data pages into the buffer cache 150, the ingest manager 226 obtains page descriptors identifying the data pages. The page descriptors include location metadata identifying storage locations in the secondary storage 152 in which to flush data pages. For a data page identified by a particular page descriptor, the location metadata includes multiple metadata values, including an extent identifier and a logical-address identifier. The extent identifier indicates a storage extent in the secondary storage 152 to which to flush the data page. The logical-address identifier indicates a logical address within the storage extent to which to flush the data page.

During operation, the ingest manager 226 locates a container in which to store the particular page descriptor. Along these lines, the ingest manager 226 hashes an extent identifier included in the particular page descriptor to generate a first hash value. The first hash value is paired with a first bucket of the first plurality of buckets 612 in the first hash table 610, thus identifying the first bucket as one in which to store the particular page descriptor. In the example operation, suppose the first hash value identifies the bucket 612-1.

The ingest manager then identifies, in the first bucket 612-1, an extent entry in which to store the particular page descriptor. Along these lines, the ingest manager 226 identifies the extent entry as an entry provided for the storage extent indicated by the extent identifier included in the particular page descriptor. If the ingest manager 226 fails to find an extent entry for the storage extent identified by the extent identifier, the ingest manager 226 adds a new extent entry to the first bucket 612-1, e.g., in a linked-list manner. In the example operation, suppose the ingest manager 226 identifies the extent entry 620-1.0, which includes the second hash table 630-1.

The ingest manager 226 further hashes a logical-address identifier included in the particular page descriptor to generate a second hash value. The second hash value is paired with a second bucket of the second plurality of buckets 632 in the second hash table 630-1, thus identifying the second bucket as one in which to store the particular page descriptor. In the example operation, suppose the second hash value identifies the second bucket 632-1.

The ingest manager then identifies, in the second bucket 632-1, a container in which to store the particular page descriptor. Along these lines, the ingest manager 226 identifies the container as one provided for the logical address indicated by the logical-address identifier included in the particular page descriptor. In some embodiments, the containers 640 in the second bucket 632-1 cover respective ranges of logical addresses within the storage extent for which the extent entry 620-1.0 is provided. In some embodiments, if the ingest manager 226 fails to find a container for the logical address identified by the logical-address identifier, the ingest manager 226 adds a new container to the second bucket 632-1, e.g., in a linked-list manner. In the example operation, suppose the ingest manager 226 identifies the container 640-1.0 to store the particular page descriptor.

The ingest manager 226 may perform similar operations to store other page descriptors during data ingestion. In this manner, the ingest manager 226 populates a group of page-descriptor containers with page descriptors based on storage locations in the secondary storage 152 to which to flush data pages identified by the page descriptors.

In some embodiments, multiple page descriptors may populate a single bucket. For example, the ingest manager 226 may generate a common hash value from hashing respective location metadata of a first page descriptor and a second page descriptor, with the common hash value identifying a particular bucket. As a result, the ingest manager 226 may add both page descriptors to the particular bucket, e.g., in a linked-list manner.

Similarly, in some embodiments, the ingest manager 226 may add multiple page descriptors to a single container, even when location metadata values included in the page descriptors identify different storage locations in secondary storage 152 in which to store data pages identified by the page descriptors. That is, a single container may cover a respective range of storage locations in the secondary storage 152. If the location metadata values identify storage locations within the respective range of storage locations, the ingest manager 226 may store the multiple page descriptors in the same container.

Advantageously, by populating the group of page-descriptor containers based on such storage locations, the ingest manager 226 promotes quick and efficient flushing of data pages from the buffer cache 150. Along these lines, in some embodiments, when flushing the data pages, the flush manager 228 accesses a particular container to obtain page descriptors identifying data pages to flush. The flush manager 228 may then flush the data pages together in a single flush job.

It should be appreciated that flushing data pages to locations that are near each other typically uses fewer resources than flushing data pages to locations that are far from each other. For example, flushing data pages to consecutive storage locations in the secondary storage 152 may be performed in a single write operation, which typically takes less time and less processing overhead than multiple write operations to non-consecutive storage locations. Thus, storing page descriptors based on storage location in secondary storage enables the flush manager 228 to effectively identify data pages to flush together from the buffer cache 150. Further details will now be provided with reference to FIG. 7.

FIG. 7 is a flowchart of a procedure 700 which is performed by specialized equipment in accordance with certain embodiments.

At 702, the ingest manager 226 populates the first group of page-descriptor containers 320a with page descriptors 330a identifying data pages 332a to flush from the buffer cache 150.

At 704, after populating the first group of page-descriptor containers 320a, the ingest manager 226 populates a second group of page-descriptor containers 320b with the additional page descriptors 330b in place of populating the first group of page-descriptor containers 320a.

At 706, the storage processing circuitry 130 directs the flush manager 228 to provide a flushing service that accesses the first group of page-descriptor containers to obtain the page descriptors identifying the data pages when flushing the data pages from the cache. In some embodiments, the storage processing circuitry 130 directs the flush manager 228 to provide the flushing service in response to predefined criteria, e.g., when the first group of page-descriptor containers 320a becomes the oldest populated group of page-descriptor containers in the buffer cache 150.

As described above, improved techniques are directed to flushing data from a cache, in which page descriptors identifying data pages to flush from the cache populate groups of page-descriptor containers. Once a group of page-descriptor containers is sufficiently full, new page descriptors begin populating a replacement group of page-descriptor containers. A flushing service accesses the filled group of page-descriptor containers to obtain the page descriptors during flushing. Providing such groups of page-descriptor containers enables the flushing service to flush consistent amounts of data from the cache. As a result, the flushing service is able to free storage space in the cache at a steady rate, enabling the cache to store new data pages without large spikes in latency caused by insufficient space.

One should appreciate that the above-described techniques do not merely collect and store data. Rather, the disclosed techniques involve flushing data from a cache in a manner that enables the flushing service to flush consistent amounts of data from the cache. Accordingly, such techniques provide steady resource reclamation, improving the operation of the cache.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the example environment 100 such as the host computers 102, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper based data communications devices and cabling, fiber optic devices and cabling, wireless devices, combinations thereof, etc. Furthermore, the network is capable of supporting LAN-based communications, SAN based communications, combinations thereof, and so on.

A typical storage system initially records incoming writes on high-performance primary storage before a background process, known as a flushing process, groups and dumps the data pages from the high-performance storage to backend storage, e.g., solid-state drives (SSDs). Further, a logger, responsible for managing the high-performance storage, utilizes a ring-based resource manager. Newly received data pages are added to a head of the ring, and the flushing process dumps the pages from a tail to the head. Once the beginning and end of the ring meet, the entire ring is filled, leading to the throttling of write I/O operations.

In the typical storage system, the flush manager initiates multiple flush jobs concurrently. Each flush job selects and processes a set of data pages from the ring. If the flush job sequentially selects pages from the tail to the head, it may significantly advance the tail after completion. However, pages chosen in this manner may lack locality in the mapper tree as the selection is based on time order rather than LBA order, leading to poor flushing efficiency. On the other hand, if the flush job only selects pages in LBA order, flushing efficiency may improve, but it might not advance the tail if the page near the tail is not selected.

Some embodiments of the current application introduce a new hybrid approach that combines pool-based and ring-based methods to streamline operation of a flush manager. These embodiments provide a ring-based log having the behavior of a pool-based log.

In these embodiments, having pool-based log behavior, which guarantees that the same amount of resource released by the flush flow is immediately available for IO ingesting flow, allows for an ingesting rate to match a flush rate. These embodiments may implement a token mechanism like the approach proposed herein or other similar mechanisms. As a result, the embodiments avoid large-step tail-moves and consequent large latency spikes.

Some embodiments provide a flush working set (FWS), which includes a hash table of extent objects (e.g., an extents hash table, EHT). In some embodiments, the number of buckets of the EHT is subject to the maximum number of extents that the backend storage supports.

Each extent object in the EHT is a hash table of containers (e.g., a leaves hash table, LHT) used to manage all the dirty pages that belong to the same extent object.

In some embodiments, the number of buckets per LHT is variable. In these embodiments, the number of buckets dynamically adapts to the workload pattern.

In some embodiments, the container size is variable. The container size may any reasonable number, e.g., it could be a leaf or a mid. In some embodiments, each FWS has a single container size.

In some embodiments, the container contains a linked list of page descriptors (PDs) that belong to the same container. In some embodiments, the PDs are linked to the container I/O ingesting path.

In some embodiments, a flusher detaches containers from the FWS during flushing. In some embodiments, the FWS is a volatile object that does not persist. In these embodiments, the FWS is rebuilt from the PD structure when data processing restarts on a given node.

In some embodiments, FWSs are populated during the data ingest. In some embodiments, there are three FWSs to track data pages. Each node in the storage environment maintains its own copies of the FWSs. An active FWS is one currently being filled. The other two FWSs may either be flushing or idle. Effectively, this divides the page-descriptor ring into three parts chronologically. New entries are added to the filling (active) FWS at peer node commit. The FWSs cycle from idle to filling to flushing to idle. The most recent I/Os are in the filling (active) FWS, the next oldest are in the second FWS and the oldest are in the third working set which will be flushing or idle depending upon the relative rates of filling and flushing. Once the filling FWS becomes sufficiently full, a switch is initiated. During the switch, the formerly filling FWS is frozen and care is taken to assure that each node's copy of the FWS has exactly the same content and to guarantee that the same set of I/Os is in the two copies.

Some embodiments include a flush regulator that is a PID controller-based regulator that monitors the deviation between the I/O ingesting rate and flushing rate and dynamically adjusts the number of flushers so that flushing rate is the same as the I/O ingesting rate. There are various resources in the data processing system. For each type of resource, it will set a regulation target in terms of resource utilization (e.g. 68%). If the utilization is above the target meaning the flush is lagging, it will increase the number of flushers to catch up. Similarly, it will decrease the number of flushers to slow down the flushing rate if the fullness is under the target.

In addition, in some embodiments, the flush regulator also monitors the overall data processing status, and if write I/O has been throttled, it will boost the number of flushers.

In some embodiments, the active filling FWS maintains a token pool. The tokens in the pool reflect the flushing progress of a paired FWS that is the oldest filled FWS. After completing a flush, the flush job updates the token pool. In these embodiments, any write has to acquire matching tokens before being placed in the filling FWS. If tokens are unavailable, even with free resources in the filling FWS, write I/O is proactively throttled. These embodiments ensure synchronization between flushing and I/O ingestion without deviation.

In some embodiments, the progress calculation for the paired FWS is based on the token pool, disregarding the ring's tail. For instance, if the oldest filled FWS starts with five data pages and three have been flushed, the progress is marked as 60%, irrespective of the flushed pages' positions in the ring. In these embodiments, the flusher's page selection is solely based on logical block address (LBA) order, without balancing between flushing efficiency and resource reclamation.

In some embodiments, the regulation target plays a vital role, especially under constant workload. For example, if we set the regulation target of the ring to 40%, this implies that the oldest filled FWS has achieved approximately 78% progress when the filling FWS is activated, assuming each FWS corresponds to one-third of the ring. Consequently, proactive throttling should have minimal impact under constant workload conditions (e.g., during key performance indicator (KPI) performance tests). The 78% calculation is derived as follows:

$$1 - \frac{40\% - 33\%}{33\%} = 78\%$$

In practice, these embodiments treat the oldest filled FWS and the filling (active) FWS as a pool, while the second oldest FWS remains a ring, resulting in a hybrid approach. These embodiments significantly simplify the flush manager's design and enhances system robustness under dynamic workloads.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method for flushing data from a cache, comprising:
populating a first group of page-descriptor containers with page descriptors identifying data pages to flush from a cache;
after populating the first group of page-descriptor containers, populating a second group of page-descriptor containers with additional page descriptors in place of populating the first group of page-descriptor containers;
directing a flushing service to access the first group of page-descriptor containers to obtain the page descriptors identifying the data pages when flushing the data pages from the cache;
incrementing a resource count based on the flushing service flushing a set of data pages from the cache, the resource count indicating resources allocated to cache storage; and
when populating the second group of page-descriptor containers with the additional page descriptors, consuming the resources allocated to cache storage.

2. The method of claim 1 wherein the page descriptors include location metadata identifying storage locations in secondary storage to which to flush the data pages; and
wherein populating the first group of page-descriptor containers includes:

adding sets of page descriptors to respective containers of the first group of page-descriptor containers based on the location metadata.

3. The method of claim 2 wherein adding the sets of page descriptors to the respective containers of the first group of page-descriptor containers includes:
adding multiple page descriptors to a container of the first group of page-descriptor containers, the flushing service obtaining the multiple page descriptors from the container to identify multiple data pages to flush together from the cache.

4. The method of claim 2 wherein the containers of the first group of page-descriptor containers are constructed and arranged to cover respective ranges of storage locations in the secondary storage; and
wherein adding the sets of page descriptors to the respective containers of the first group of page-descriptor containers includes:
adding a set of page descriptors to a particular container of the first group of page-descriptor containers based on the set of page descriptors including location metadata identifying a respective set of storage locations within a range of storage locations covered by the particular container.

5. The method of claim 2, further comprising:
hashing the location metadata to generate hash values identifying buckets in a set of hash tables, the buckets including the containers of the first group of page-descriptor containers to which the sets of page descriptors are added.

6. The method of claim 5 wherein a first hash table has a first plurality of buckets, a first bucket of the first plurality of buckets including a second hash table having a second plurality of buckets, a second bucket in the second plurality of buckets including one or more of the containers of the first group of page-descriptor containers; and
wherein hashing the location metadata includes:
hashing a first metadata value included in a particular page descriptor to generate a first hash value identifying the first bucket of the first plurality of buckets; and
hashing a second metadata value included in the particular page descriptor to generate a second hash value identifying the second bucket of the second plurality of buckets from the second hash table included in the first bucket, the second bucket including a container of the first group of page-descriptor containers in which to add the particular page descriptor.

7. The method of claim 6 wherein hashing the first metadata value includes:
hashing, as the first metadata value, an extent identifier indicating a storage extent in secondary storage to which to flush a data page identified by the particular page descriptor; and
wherein hashing the second metadata value includes:
hashing, as the second metadata value, a logical-address identifier indicating a logical address within the storage extent to which to flush the data page.

8. The method of claim 5 wherein the page descriptors populating the first group of page-descriptor containers include a first page descriptor and a second page descriptor identifying respective data pages;
wherein hashing the location metadata includes:
generating a common hash value from hashing respective location metadata of the first page descriptor and the second page descriptor, the respective location metadata indicating different respective storage locations to which to flush the respective data pages, the common hash value identifying a particular bucket in the set of hash tables; and wherein adding the sets of page descriptors to the respective containers includes:

adding both the first page descriptor and the second page descriptor to a container in the particular bucket.

9. The method of claim 5, further comprising:

receiving a set of input/output (I/O) requests from a set of hosts, the set of I/O requests providing a change in an I/O workload of the cache; and adjusting, based on the change in the I/O workload, at least one of: (i) a number of the buckets storing the containers of the first group of page-descriptor containers to which the sets of page descriptors are added or (ii) a storage size allocated to one or more of the containers of the first group of page-descriptor containers.

10. The method of claim 1, wherein a rate at which the cache ingests data pages identified by the additional page descriptors is limited while the resource count indicates insufficient resources allocated to cache storage.

11. The method of claim 10 wherein the resource count is a number of tokens in a token pool, the tokens indicating resources allocated to storing the additional page descriptors in the second group of page-descriptor containers; and wherein incrementing the count of the resource counter includes:

increasing the number of tokens in the token pool based on a number of data pages in the set of data pages that the flushing service flushes from the cache.

12. The method of claim 1, further comprising:

after populating the second group of page-descriptor containers, populating a third group of page-descriptor containers with other page descriptors in place of populating the second group of page-descriptor containers; and while the third group of page-descriptor containers is being populated, directing the flushing service to flush (i) at least a portion of the data pages identified by the page descriptors populating the first group of page-descriptor containers and (ii) at least a portion of additional data pages identified by the additional page descriptors populating the second group of page-descriptor containers.

13. The method of claim 1, further comprising:

after directing the flushing service to access the first group of page-descriptor containers to flush the data pages, detecting that the cache has exceeded a predefined fullness level; and in response to detecting that the cache has exceeded a predefined fullness level, directing the flushing service to increase a rate at which the flushing service flushes the data pages from the cache.

14. The method of claim 1 wherein incrementing the resource count includes:

detecting that the flushing service has flushed the set of data pages from the cache; and in response to detecting that the flushing service has flushed the set of data pages from the cache, increasing the resource count by an amount proportional to a number of data pages in the set of data pages.

15. Data storage equipment, comprising:

memory; and control circuitry coupled with the memory, the memory storing instructions which, when carried out by the control circuitry, cause the control circuitry to perform a method of:

populating a first group of page-descriptor containers with page descriptors identifying data pages to flush from a cache;

after populating the first group of page-descriptor containers, populating a second group of page-descriptor containers with additional page descriptors in place of populating the first group of page-descriptor containers;

directing a flushing service to access the first group of page-descriptor containers to obtain the page descriptors identifying the data pages when flushing the data pages from the cache;

incrementing a resource count based on the flushing service flushing a set of data pages from the cache, the resource count indicating resources allocated to cache storage; and when populating the second group of page-descriptor containers with the additional page descriptors, consuming the resources allocated to cache storage.

16. The data storage equipment of claim 15, wherein the page descriptors include location metadata identifying storage locations in secondary storage to which to flush the data pages; and wherein populating the first group of page-descriptor containers includes:

adding sets of page descriptors to respective containers of the first group of page-descriptor containers based on the location metadata.

17. The data storage equipment of claim 16 wherein adding the sets of page descriptors to the respective containers of the first group of page-descriptor containers includes:

adding multiple page descriptors to a container of the first group of page-descriptor containers, the flushing service obtaining the multiple page descriptors from the container to identify multiple data pages to flush together from the cache.

18. The data storage equipment of claim 16 wherein the containers of the first group of page-descriptor containers are constructed and arranged to cover respective ranges of storage locations in the secondary storage; and wherein adding the sets of page descriptors to the respective containers of the first group of page-descriptor containers includes:

adding a set of page descriptors to a particular container of the first group of page-descriptor containers based on the set of page descriptors including location metadata identifying a respective set of storage locations within a range of storage locations covered by the particular container.

19. A computer program product having a non-transitory computer readable medium which stores a set of instructions for flushing data from a cache, the set of instructions, when carried out by computerized circuitry, causing the computerized circuitry to perform a method of:

populating a first group of page-descriptor containers with page descriptors identifying data pages to flush from a cache;

after populating the first group of page-descriptor containers, populating a second group of page-descriptor containers with additional page descriptors in place of populating the first group of page-descriptor containers;

directing a flushing service to access the first group of page-descriptor containers to obtain the page descriptors identifying the data pages when flushing the data pages from the cache;

incrementing a resource count based on the flushing service flushing a set of data pages from the cache, the resource count indicating resources allocated to cache storage; and when populating the second group of page-descriptor containers with the additional page descriptors, consuming the resources allocated to cache storage.

* * * * *